(12) United States Patent
Li

(10) Patent No.: US 9,338,642 B2
(45) Date of Patent: May 10, 2016

(54) METHOD AND APPARATUS FOR PROCESSING APPLICATION PROGRAM, AND MOBILE TERMINAL THEREFOR

(75) Inventor: Yonghua Li, Guangdong (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 151 days.

(21) Appl. No.: 14/240,714

(22) PCT Filed: Jun. 14, 2012

(86) PCT No.: PCT/CN2012/076908
§ 371 (c)(1),
(2), (4) Date: Feb. 24, 2014

(87) PCT Pub. No.: WO2013/026311
PCT Pub. Date: Feb. 28, 2013

(65) Prior Publication Data
US 2014/0235220 A1 Aug. 21, 2014

(30) Foreign Application Priority Data
Aug. 25, 2011 (CN) .......................... 2011 1 0246497

(51) Int. Cl.
*H04M 3/00* (2006.01)
*H04W 8/22* (2009.01)
(Continued)

(52) U.S. Cl.
CPC ................. *H04W 8/22* (2013.01); *G06F 1/324* (2013.01); *G06F 1/3206* (2013.01); *G06F 9/4893* (2013.01)

(58) Field of Classification Search
CPC .............................. H04W 88/02; H04W 88/06
USPC .............................................. 455/418, 552.1
See application file for complete search history.

(56) References Cited

U.S. PATENT DOCUMENTS 5,793,365 A 8/1998 Tang et al.
9,032,413 B2 * 5/2015 Schwartz, Jr. ...... G06F 9/44521
718/104

(Continued)

FOREIGN PATENT DOCUMENTS

CN 101403981 A 4/2009
CN 101883184 A 11/2010
(Continued)

OTHER PUBLICATIONS

International Search Report issued in International Application No. PCT/CN2012/076908 dated Sep. 27, 2012.
(Continued)

*Primary Examiner* — Temica M Beamer
(74) *Attorney, Agent, or Firm* — McDermott Will & Emery LLP

(57) ABSTRACT

The present disclosure, pertaining to the field of computer technologies, discloses a method and apparatus for processing an application program, and a mobile terminal therefor. The method includes: determining a current running state of an application program currently opened on a mobile terminal; performing a corresponding operation for the opened application program according to the determined running state. The apparatus includes: a determining module, configured to determine a current running state of an application program currently opened on a mobile terminal; an operation performing module, configured to perform a corresponding operation for the opened application program according to the determined running state. According to the present disclosure, current running states of application programs opened on a mobile terminal are determined, and corresponding operations are performed for the opened application programs according to the determined different running states. This, as compared with performing the same operation for all opened application programs, saves system processing resources, power, and network bandwidth resources.

20 Claims, 1 Drawing Sheet

(51) Int. Cl.
*G06F 1/32* (2006.01)
*G06F 9/48* (2006.01)

(56) References Cited

U.S. PATENT DOCUMENTS

| | | |
|---|---|---|
| 2010/0054618 A1 | 3/2010 | Kawazoe et al. |
| 2011/0055740 A1 | 3/2011 | Coleman et al. |
| 2013/0288718 A1* | 10/2013 | MacGougan ..... H04W 52/0274 455/456.4 |

FOREIGN PATENT DOCUMENTS

| JP | 2005-312011 A | 11/2005 |
|---|---|---|
| WO | 02/079957 A2 | 10/2002 |

OTHER PUBLICATIONS

Chinese Office Action issued in corresponding Chinese Patent Applicaiton No. 201110246497.1, mailed on Sep. 30, 2014; with partial English translation.

Extended European Search Report issued in corresponding European Patent Application No. 12825194.9, mailed on Mar. 31, 2015.

Korean Office Notice of Reason for Rejection issued in corresponding Korean Patent Application No. 10-2014-7006619, mailed on Sep. 8, 2015; with partial English translation.

* cited by examiner

METHOD AND APPARATUS FOR PROCESSING APPLICATION PROGRAM, AND MOBILE TERMINAL THEREFOR

RELATED APPLICATIONS

This application is the U.S. National Phase under 35 U.S.C. §371 of International Application No. PCT/CN2012/076908, filed on Jun. 14, 2012, which in turn claims the benefit of Chinese Application No. 201110246497.1, filed on Aug. 25, 2011, the disclosures of which Applications are incorporated by reference herein.

TECHNICAL FIELD

The present disclosure relates to the field of computer technologies, and in particular, to method and apparatus for processing an application program, and a mobile terminal therefor.

BACKGROUND

With the development of science and technology, the functionality of mobile terminals is more and more powerful, and more and more application programs are integrated on mobile terminals. Accordingly, how to effectively manage the application programs becomes a hot issue for research.

Currently, once an application program on a mobile terminal is opened, one operational policy is performed by the system for the opened application program before the application program is closed. For example, a screen refresh operation is performed for the opened application program, or such an operation as network request is performed with a fixed frequency.

To sum up, the prior art has at least the following problem:

When a plurality of application programs are opened on a mobile terminal, a user may not use or operate some of the application programs, and therefore, performing the same operation policy for all opened application programs will consume a large number of system processing resources, and waste power and network bandwidth resources.

SUMMARY

To save system processing resources, power, and network bandwidth resources, embodiments of the present disclosure provide a method and apparatus for processing an application program, and a mobile terminal therefore. The technical solutions are as follows:

A method for processing an application program is provided, where the method includes:

determining a current running state of an application program currently opened on a mobile terminal; and performing a corresponding operation for the opened application program according to the determined running state.

The determining a current running state of an application program currently opened on a mobile terminal includes:

when the interface of the opened application program is displayed on top of the screen of the mobile terminal and a user is performing an operation on the interface of the opened application program, determining that the opened application program is currently in a foreground running state;

when the interface of the opened application program is displayed on top of the screen of the mobile terminal and a user is not performing an operation on the interface of the opened application program, determining that the opened application program is currently in a semi-foreground and semi-background running state; and when the interface of the opened application program is not displayed on the screen of the mobile terminal, determining that the opened application program is currently in a background running state.

The performing a corresponding operation for the opened application program according to the determined running state includes:

when the opened application program is currently in the foreground running state, performing a screen refresh operation and/or a network operation with a first frequency;

when the opened application program is currently in the semi-foreground and semi-background running state, performing no screen refresh operation and/or performing a network operation with a second frequency for the opened application program, where the second frequency is smaller than the first frequency; and when the opened application program is currently in the background running state, performing no screen refresh operation and/or performing a network operation with a third frequency for the opened application program, where the third frequency is smaller than the second frequency.

The performing a corresponding operation for the opened application program according to the determined running state further includes:

performing a corresponding operation for the opened application program according to the determined running state and the duration of the determined running state.

The performing a corresponding operation for the opened application program according to the determined running state and the duration of the determined running state includes:

when the opened application program is currently in the foreground running state, performing a screen refresh operation and/or a network operation with a first frequency;

when the opened application program is currently in the semi-foreground and semi-background running state, performing no screen refresh operation for the opened application program, and/or performing network operations with different frequencies for the opened application program during different time segments of the duration of the semi-foreground and semi-background running state, where the longer the duration of the semi-foreground and semi-background running state is, the smaller the frequency of the network operation is, and the different frequencies of the network operations in the semi-foreground and semi-background running state are smaller than the first frequency; and when the opened application program is currently in the background running state, performing no screen refresh operation for the opened application program, and/or performing network operations with different frequencies for the opened application program during different time segments of the duration of the background running state, where the different frequencies of the network operations in the background running state are smaller than the different frequencies of the network operations in the semi-foreground and semi-background running state.

An apparatus for processing an application program is provided, where the apparatus includes:

a determining module, configured to determine a current running state of an application program currently opened on a mobile terminal; and an operation performing module, configured to perform a corresponding operation for the opened application program according to the determined running state.

The determining module is further configured to:

when the interface of the opened application program is displayed on top of the screen of the mobile terminal and a user is performing an operation on the interface of the opened application program, determine that the opened application program is currently in a foreground running state;

when the interface of the opened application program is displayed on top of the screen of the mobile terminal and a user is not performing an operation on the interface of the opened application program, determine that the opened application program is currently in a semi-foreground and semi-background running state; and when the interface of the opened application program is not displayed on the screen of the mobile terminal, determine that the opened application program is currently in a background running state.

The operation performing module is further configured to:

when the opened application program is currently in the foreground running state, perform a screen refresh operation and/or a network operation with a first frequency;

when the opened application program is currently in the semi-foreground and semi-background running state, perform no screen refresh operation and/or perform a network operation with a second frequency for the opened application program, where the second frequency is smaller than the first frequency; and when the opened application program is currently in the background running state, perform no screen refresh operation and/or perform a network operation with a third frequency for the opened application program, where the third frequency is smaller than the second frequency.

The operation performing module is further configured to:

perform a corresponding operation for the opened application program according to the determined running state and the duration of the determined running state.

The operation performing module is further configured to:

when the opened application program is currently in the foreground running state, perform a screen refresh operation and/or a network operation with a first frequency;

when the opened application program is currently in the semi-foreground and semi-background running state, perform no screen refresh operation for the opened application program, and/or perform network operations with different frequencies for the opened application program during different time segments of the duration of the semi-foreground and semi-background running state, where the longer the duration of the semi-foreground and semi-background running state is, the smaller the frequency of the network operation is, and the different frequencies of the network operations in the semi-foreground and semi-background running state are smaller than the first frequency; and when the opened application program is currently in the background running state, perform no screen refresh operation for the opened application program, and/or perform network operations with different frequencies for the opened application program during different time segments of the duration of the background running state, where the different frequencies of the network operations in the background running state are smaller than the different frequencies of the network operations in the semi-foreground and semi-background running state.

A mobile terminal includes any one of the apparatuses for processing an application program as described above.

The mobile terminal is a mobile phone, where the mobile phone includes: a radio frequency circuit, an audio circuit, and a power circuit.

The radio frequency circuit is configured to establish communication between the mobile phone and a wireless network, to implement data receiving and transmission between the mobile phone and the wireless network.

The audio circuit is configured to: collect sounds and convert the collected sounds into audio data, such that the mobile phone transmits the audio data to the wireless network via the radio frequency circuit; and/or convert the audio data received by the mobile phone from the wireless network via the radio frequency circuit into the sounds and play the same for a user. The power circuit is configured to supply power for each of circuits or components of the mobile phone. The technical solutions provided in the embodiments of the present disclosure achieve the following beneficial effects:

current running states of application programs opened on a mobile terminal are determined, and corresponding operations are performed form the opened application programs according to the determined different running states, such that, as compared with performing the same operation for all opened application programs, system processing resources, power, and network bandwidth resources are saved.

BRIEF DESCRIPTION OF THE DRAWINGS

To illustrate the technical solutions in the embodiments of the present disclosure or in the prior art more clearly, the accompanying drawings required for describing the embodiments or the prior art will be described as follows. Apparently, the accompanying drawings in the following description merely show some embodiments of the present disclosure, and persons of ordinary skill in the art can derive other drawings from these accompanying drawings without creative efforts.

DETAILED DESCRIPTION

To make the objectives, technical solutions, and advantages of the present disclosure clearer, the embodiments of the present disclosure are described in detail below with reference to the accompanying drawings.

Figure 1:
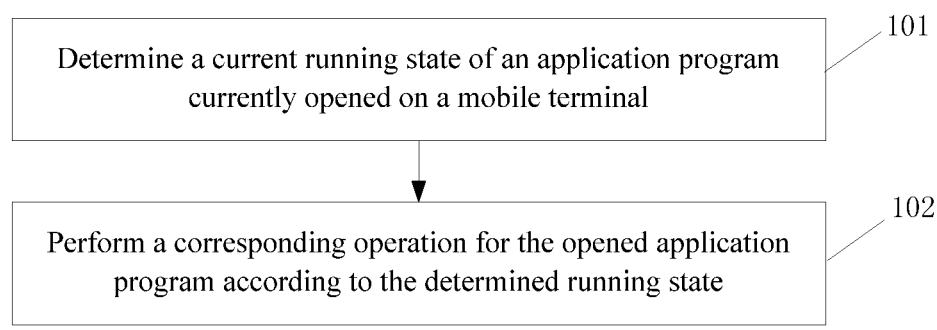
FIG. 1 is a flowchart of a method for processing an application program according to one embodiment of the present disclosure.

Referring to FIG. 1, one embodiment provides a method for processing an application program. The method includes the following steps:

101: determining a current running state of an application program currently opened on a mobile terminal; and

102: performing a corresponding operation for the opened application program according to the determined running state.

Step 101 specifically includes:

when the interface of the opened application program is displayed on top of the screen of the mobile terminal and a user is performing an operation on the interface of the opened application program, determining that the opened application program is currently in a foreground running state;

when the interface of the opened application program is displayed on top of the screen of the mobile terminal and a user is not performing an operation on the interface of the opened application program, determining that the opened application program is currently in a semi-foreground and semi-background running state;

when the interface of the opened application program is not displayed on the screen of the mobile terminal, determining that the opened application program is currently in a background running state.

It should be noted that the determining process may be triggered by triggering an apparatus for processing an application program on the mobile terminal by the user, or application programs opened on the mobile terminals are determined at an interval of a preset duration. This embodiment sets no limitation on the determining process.

Step 102 specifically includes:

102*a*: when the opened application program is currently in the foreground running state, performing a screen refresh operation and/or a network operation with a first frequency;

102*b*: when the opened application program is currently in the semi-foreground and semi-background running state, performing no screen refresh operation and/or performing a network operation with a second frequency for the opened application program, where the second frequency is smaller than the first frequency; and

102*c*: when the opened application program is currently in the background running state, performing no screen refresh operation and/or performing a network operation with a third frequency for the opened application program, where the third frequency is smaller than the second frequency.

The network operations may be operations for maintaining communication or connection with the network, or operations for acquiring network status condition information. This embodiment sets no limitation on the specific network operations.

Operations in steps 102*a*, 102*b*, and 102*c* are described as follows with reference to the application scenarios.

The mobile terminal needs to periodically maintain communication or connection with the network. If the application program opened on the mobile terminal is in the foreground running state, the network connection operation is performed for the application program at an interval of two minutes; if the application program opened on the mobile terminal is in the semi-foreground and semi-background running state, the network connection operation is performed for the application program at an interval of five minutes; and if the application program opened on the mobile terminal is in the background running state, the network connection operation is performed for the application program at an interval of 10 minutes.

As seen from the above application scenario, according to the present disclosure, different operations may be performed for the opened application programs according to the determined different running states; and with the decrease of the frequency of using the application programs by the user, the frequency of performing operations for the application programs by the system is decreased. In this way, the system processing resources and the power of the mobile terminal and so on are saved, and with the decrease of the frequency of the network operation, the network bandwidth resources linking to exterior are also saved.

Step 102 further includes:

performing a corresponding operation for the opened application program according to the determined running state and the duration of the determined running state. Specifically, step 102 includes:

102*d*: when the opened application program is currently in the foreground running state, performing a screen refresh operation and/or a network operation with a first frequency;

102*e*: when the opened application program is currently in the semi-foreground and semi-background running state, performing no screen refresh operation for the opened application program, and/or perform network operations with different frequencies for the opened application program during different time segments of the duration of the semi-foreground and semi-background running state, where the longer the duration of the semi-foreground and semi-background running state is, the smaller the frequency of the network operation is, and the different frequencies of the network operations in the semi-foreground and semi-background running state are smaller than the first frequency; and

102*f*: when the opened application program is currently in the background running state, performing no screen refresh operation for the opened application program, and/or perform network operations with different frequencies for the opened application program during different time segments of the duration of the background running state, where the different frequencies of the network operations in the background running state are smaller than the different frequencies of the network operations in the semi-foreground and semi-background running state.

Operations in steps 102*d*, 102*e*, and 102*f* are described as follows with reference to the application scenarios.

The mobile terminal needs to periodically maintain communication or connection with the network. If the application program opened on the mobile terminal is in the foreground running state, the network connection operation is performed for the application program at an interval of two minutes; if the application program opened on the mobile terminal is in the semi-foreground and semi-background running state, within the 10-minute duration of this state, the network connection operation is performed for the application program at an interval of four minutes, and within the 10-20-minute duration of this state, the network connection operation is performed for the application program at an interval of five minutes, where the frequency of the network operation decreases with the increase of the duration of the state; and if the application program opened on the mobile terminal is in the background running state, within the 10-minute duration of this state, the network connection operation is performed for the application program at an interval of eight minutes, and within the 10-20-minute duration of this state, the network connection operation is performed for the application program at an interval of nine minutes, where the frequency of the network operation decreases with the increase of the duration of the state.

As seen from the above application scenario, according to the present disclosure, different operations may be performed for the opened application programs according to the determined different running states and the duration thereof; and with the decrease of the frequency of using the application programs by the user and the increase of the duration of the states, the frequency of performing operations for the application programs by the system is decreased. In this way, the system processing resources, the power of the mobile terminal, and the network bandwidth resources can be saved individually and they are more efficiently saved.

It should be noted that the frequency of the network operation according to the present disclosures may be set or adjusted by a person skilled in the art. Different frequencies may be set for mobile terminals having different capabilities. In addition, the frequency of the network operation may also be set or adjusted by a mobile terminal user. Different frequencies may be set according to the user's needs on the network operation on the mobile terminal and user's operation preferences.

According to this embodiment, current running states of application programs opened on a mobile terminal are determined, and corresponding operations are performed for the opened application programs according to the determined different running states, such that, as compared with performing the same operation for all opened application programs, system processing resources, power, and network bandwidth resources are saved.

Figure 2:
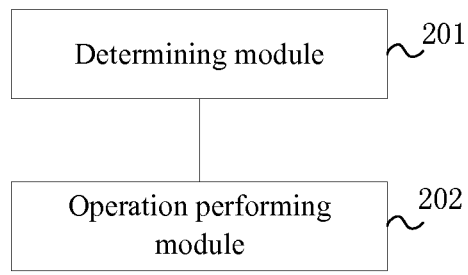
FIG. 2 is a schematic structural diagram of an apparatus for processing an application program according to another embodiment of the present disclosure.

Referring to FIG. 2, another embodiment provides an apparatus for processing an application program. The apparatus includes the following steps:

a determining module 201, configured to determine a current running state of an application program currently opened on a mobile terminal; and an operation performing module 202, configured to perform a corresponding operation for the opened application program according to the determined running state.

The determining module 201 is further configured to:

when the interface of the opened application program is displayed on top of the screen of the mobile terminal and a user is performing an operation on the interface of the opened application program, determine that the opened application program is currently in a foreground running state;

when the interface of the opened application program is displayed on top of the screen of the mobile terminal and a user is not performing an operation on the interface of the opened application program, determine that the opened application program is currently in a semi-foreground and semi-background running state;

when the interface of the opened application program is not displayed on the screen of the mobile terminal, determine that the opened application program is currently in a background running state.

The operation performing module 202 is further configured to:

when the opened application program is currently in the foreground running state, perform a screen refresh operation and/or a network operation with a first frequency;

when the opened application program is currently in the semi-foreground and semi-background running state, perform no screen refresh operation and/or perform a network operation with a second frequency for the opened application program, where the second frequency is smaller than the first frequency; and when the opened application program is currently in the background running state, perform no screen refresh operation and/or perform a network operation with a third frequency for the opened application program, where the third frequency is smaller than the second frequency.

The operation performing module 202 is further configured to:

perform a corresponding operation for the opened application program according to the determined running state and the duration of the determined running state.

The operation performing module 202 is further configured to:

when the opened application program is currently in the foreground running state, perform a screen refresh operation and/or a network operation with a first frequency;

when the opened application program is currently in the semi-foreground and semi-background running state, perform no screen refresh operation for the opened application program, and/or perform network operations with different frequencies for the opened application program during different time segments of the duration of the semi-foreground and semi-background running state, where the longer the duration of the semi-foreground and semi-background running state is, the smaller the frequency of the network operation is, and the different frequencies of the network operations in the semi-foreground and semi-background running state are smaller than the first frequency; and when the opened application program is currently in the background running state, perform no screen refresh operation for the opened application program, and/or perform network operations with different frequencies for the opened application program during different time segments of the duration of the background running state, where the different frequencies of the network operations in the background running state are smaller than the different frequencies of the network operations in the semi-foreground and semi-background running state.

According to this embodiment, current running states of application programs opened on a mobile terminal are determined, and corresponding operations are performed for the opened application programs according to the determined different running states, such that, as compared with performing the same operation for all opened application programs, system processing resources, power, and network bandwidth resources are saved.

An embodiment of the present disclosure further provides a mobile terminal, where the mobile terminal includes any one of the apparatuses for processing an application program as described above.

An embodiment of the present disclosure further provides a mobile terminal. Preferably, the mobile terminal is a mobile phone. The mobile terminal includes any one of the apparatuses for processing an application program according to the above embodiments, and further includes: a radio frequency circuit, an audio circuit, and a power circuit.

The radio frequency circuit is configured to establish communication between the mobile phone and a wireless network, to implement data receiving and transmission between the mobile phone and the wireless network.

The audio circuit is configured to: collect sounds and convert the collected sounds into audio data, such that the mobile phone transmits the audio data to the wireless network via the radio frequency circuit; and/or convert the audio data received by the mobile phone from the wireless network via the radio frequency circuit into the sounds and play the same for a user.

The power circuit is configured to supply power for each of circuits or components of the mobile phone to ensure that the mobile phone works normally.

The above-mentioned mobile terminal may be a mobile phone, a man-machine interaction terminal, an e-book, or another terminal device having the displaying function. When a mobile phone is used as the mobile terminal, the mobile phone further includes: a housing, a circuit board, a microphone, and a loudspeaker so as to implement basic functions of the mobile phone. The housing, circuit board, microphone, and loudspeaker are respectively described as follows:

The circuit board is arranged inside the housing.

The microphone is configured to collect sounds and convert the collected sounds into audio data such that the mobile phone transmits the audio data to the wireless network via the radio frequency circuit.

The loudspeaker is configured to convert the audio data received by the mobile phone from the wireless network via the radio frequency circuit into sounds, and play the same for a user.

It should be noted that, during processing of an application program, the apparatus for processing an application program according to the above embodiment only is described by only using division of the above functional modules for description. In practice, the functions may be assigned to different functional modules for implementation as required. To be specific, the internal structure of the apparatus is divided into different functional modules to implement all or part of the above-described functions. In addition, the apparatus for processing an application program according to the above embodiment is based on the same inventive concept of the method for processing an application program according to the method embodiment, where the specific implementation is elaborated in the method embodiments, which is not be detailed herein any further.

A person skilled in the art should understand that all or part of steps of the preceding methods may be implemented by hardware or hardware following instructions of programs. The programs may be stored in a computer readable storage medium. The storage medium may be a read only memory, a magnetic disk, or a compact disc-read only memory.

Described above are merely preferred embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A method for processing an application program, comprising:
    determining a current running state of an application program opened on a mobile terminal; and
    performing a corresponding operation for the opened application program according to the determined running state, wherein:
    the performing a corresponding operation for the application program according to the determined running state comprises:
    performing a screen refresh operation and/or a network operation with a first frequency for the opened application program when the opened application program is currently in the foreground running state;
    performing no screen refresh operation and/or performing a network operation with a second frequency for the opened application program, wherein the second frequency is smaller than the first frequency when the opened application program is currently in the semi-foreground and semi-background running state; and
    performing no screen refresh operation and/or performing a network operation with a third frequency for the opened application program, wherein the third frequency is smaller than the second frequency when the opened application program is currently in the background running state.

2. The method according to claim 1, wherein the determining a current running state of an application program opened on a mobile terminal comprises:
    determining that the opened application program is currently in a foreground running state when the interface of the opened application program is displayed on top of the screen of the mobile terminal and a user is performing an operation on the interface of the opened application program;
    determining that the opened application program is currently in a semi-foreground and semi-background running state when the interface of the opened application program is displayed on top of the screen of the mobile terminal and a user is not performing an operation on the interface of the opened application program; and
    determining that the opened application program is currently in a background running state when the interface of the opened application program is not displayed on the screen of the mobile terminal.

3. The method according to claim 1, wherein the performing a corresponding operation for the application program according to the determined running state further comprises:
    performing a corresponding operation for the opened application program according to the determined running state and the duration of the determined running state.

4. The method according to claim 3, wherein the performing a corresponding operation for the opened application program according to the determined running state and the duration of the determined running state comprises:
    performing a screen refresh operation and/or a network operation with a first frequency when the opened application program is currently in the foreground running state;
    performing no screen refresh operation for the opened application program, and/or, performing network operations with different frequencies for the opened application program during different time segments of the duration of the semi-foreground and semi-background running state, when the opened application program is currently in the semi-foreground and semi-background running state, wherein the longer the duration of the semi-foreground and semi-background running state is, the smaller the frequency of the network operation is, and the different frequencies of the network operations in the semi-foreground and semi-background running state are smaller than the first frequency; and
    performing no screen refresh operation for the opened application program, and/or, performing network operations with different frequencies for the opened application program during different time segments of the duration of the background running state, when the opened application program is currently in the background running state, wherein the different frequencies of the network operations in the background running state are smaller than the different frequencies of the network operations in the semi-foreground and semi-background running state.

5. A method for processing an application program, comprising:
    determining a current running state of an application program opened on a mobile terminal; and
    performing a corresponding operation for the opened application program according to the determined running state, wherein:
    the performing a corresponding operation for the application program according to the determined running state further comprises:
    performing a corresponding operation for the opened application program according to the determined running state and the duration of the determined running state, and
    the performing a corresponding operation for the opened application program according to the determined running state and the duration of the determined running state comprises:
    performing a screen refresh operation and/or a network operation with a first frequency when the opened application program is currently in the foreground running state;
    performing no screen refresh operation for the opened application program, and/or, performing network operations with different frequencies for the opened application program during different time segments of the duration of the semi-foreground and semi-background running state, when the opened application program is currently in the semi-foreground and semi-background running state, wherein the longer the duration of the semi-foreground and semi-background running state is, the smaller the frequency of the network operation is, and the different frequencies of the network operations in the semi-foreground and semi-background running state are smaller than the first frequency; and performing no screen refresh operation for the opened application program, and/or, performing network operations with different frequencies for the opened application program during different time segments of the duration of the background running state, when the opened application program is currently in the background running state, wherein the different frequencies of the network operations in the background running state are smaller than the different frequencies of the network operations in the semi-foreground and semi-background running state.

6. An apparatus for processing an application program startup, comprising:
   a determining module, configured to determine a current running state of an application program currently opened on a mobile terminal; and
   an operation performing module, configured to perform a corresponding operation for the opened application program according to the determined running state, wherein:
   the operation performing module is further configured to:
   perform a screen refresh operation and/or a network operation with a first frequency when the opened application program is currently in the foreground running state;
   perform no screen refresh operation and/or perform a network operation with a second frequency for the opened application program when the opened application program is currently in the semi-foreground and semi-background running state, wherein the second frequency is smaller than the first frequency; and
   perform no screen refresh operation and/or perform a network operation with a third frequency for the opened application program when the opened application program is currently in the background running state, wherein the third frequency is smaller than the second frequency.

7. The apparatus according to claim 6, wherein the determining module is further configured to:
   determine that the opened application program is currently in a foreground running state when the interface of the opened application program is displayed on top of the screen of the mobile terminal and a user is performing an operation on the interface of the opened application program;
   determine that the opened application program is currently in a semi-foreground and semi-background running state when the interface of the opened application program is displayed on top of the screen of the mobile terminal and a user is not performing an operation on the interface of the opened application program; and
   determine that the opened application program is currently in a background running state when the interface of the opened application program is not displayed on the screen of the mobile terminal.

8. The apparatus according to claim 6, wherein the operation performing module is further configured to:
   perform a corresponding operation for the opened application program according to the determined running state and the duration of the determined running state.

9. The apparatus according to claim 8, wherein the operation performing module is further configured to:
   perform a screen refresh operation and/or a network operation with a first frequency when the opened application program is currently in the foreground running state;
   perform no screen refresh operation for the opened application program when the opened application program is currently in the semi-foreground and semi-background running state, and/or, perform network operations with different frequencies for the opened application program during different time segments of the duration of the semi-foreground and semi-background running state, wherein the longer the duration of the semi-foreground and semi-background running state is, the smaller the frequency of the network operation is, and the different frequencies of the network operations in the semi-foreground and semi-background running state are smaller than the first frequency; and
   perform no screen refresh operation for the opened application program when the opened application program is currently in the background running state, and/or, perform network operations with different frequencies for the opened application program during different time segments of the duration of the background running state, wherein the different frequencies of the network operations in the background running state are smaller than the different frequencies of the network operations in the semi-foreground and semi-background running state.

10. An apparatus for processing an application program startup, comprising:
    a determining module, configured to determine a current running state of an application program currently opened on a mobile terminal; and
    an operation performing module, configured to perform a corresponding operation for the opened application program according to the determined running state, wherein:
    the operation performing module is further configured to:
    perform a corresponding operation for the opened application program according to the determined running state and the duration of the determined running state;
    perform a screen refresh operation and/or a network operation with a first frequency when the opened application program is currently in the foreground running state;
    perform no screen refresh operation for the opened application program when the opened application program is currently in the semi-foreground and semi-background running state, and/or, perform network operations with different frequencies for the opened application program during different time segments of the duration of the semi-foreground and semi-background running state, wherein the longer the duration of the semi-foreground and semi-background running state is, the smaller the frequency of the network operation is, and the different frequencies of the network operations in the semi-foreground and semi-background running state are smaller than the first frequency; and
    perform no screen refresh operation for the opened application program when the opened application program is currently in the background running state, and/or, perform network operations with different frequencies for the opened application program during different time segments of the duration of the background running state, wherein the different frequencies of the network operations in the background running state are smaller than the different frequencies of the network operations in the semi-foreground and semi-background running state.

11. A mobile terminal, comprising the apparatus according to claim 6.

12. A mobile terminal, comprising the apparatus according to claim 7.

13. A mobile terminal, comprising the apparatus according to claim 8.

14. A mobile terminal, comprising the apparatus according to claim 9.

15. A mobile terminal, comprising the apparatus according to claim 10.

16. The mobile terminal according to claim 11, wherein:
the mobile terminal is a mobile phone,
the mobile phone comprises a radio frequency circuit, an audio circuit and a power circuit,
the radio frequency circuit is configured to establish communication between the mobile phone and a wireless network, to implement data receiving and transmission between the mobile phone and the wireless network,
the audio circuit is configured to: collect sounds and convert the collected sounds into audio data, such that the mobile phone transmits the audio data to the wireless network via the radio frequency circuit; and/or convert the audio data received by the mobile phone from the wireless network via the radio frequency circuit into the sounds and play the same for a user; and
the power circuit is configured to supply power for each of circuits or components of the mobile phone.

17. The mobile terminal according to claim 12, wherein:
the mobile terminal is a mobile phone,
the mobile phone comprises a radio frequency circuit, an audio circuit and a power circuit,
the radio frequency circuit is configured to establish communication between the mobile phone and a wireless network, to implement data receiving and transmission between the mobile phone and the wireless network,
the audio circuit is configured to: collect sounds and convert the collected sounds into audio data, such that the mobile phone transmits the audio data to the wireless network via the radio frequency circuit; and/or convert the audio data received by the mobile phone from the wireless network via the radio frequency circuit into the sounds and play the same for a user; and
the power circuit is configured to supply power for each of circuits or components of the mobile phone.

18. The mobile terminal according to claim 13, wherein:
the mobile terminal is a mobile phone,
the mobile phone comprises a radio frequency circuit, an audio circuit and a power circuit,
the radio frequency circuit is configured to establish communication between the mobile phone and a wireless network, to implement data receiving and transmission between the mobile phone and the wireless network,
the audio circuit is configured to: collect sounds and convert the collected sounds into audio data, such that the mobile phone transmits the audio data to the wireless network via the radio frequency circuit; and/or convert the audio data received by the mobile phone from the wireless network via the radio frequency circuit into the sounds and play the same for a user; and
the power circuit is configured to supply power for each of circuits or components of the mobile phone.

19. The mobile terminal according to claim 14, wherein:
the mobile terminal is a mobile phone,
the mobile phone comprises a radio frequency circuit, an audio circuit and a power circuit,
the radio frequency circuit is configured to establish communication between the mobile phone and a wireless network, to implement data receiving and transmission between the mobile phone and the wireless network,
the audio circuit is configured to: collect sounds and convert the collected sounds into audio data, such that the mobile phone transmits the audio data to the wireless network via the radio frequency circuit; and/or convert the audio data received by the mobile phone from the wireless network via the radio frequency circuit into the sounds and play the same for a user; and
the power circuit is configured to supply power for each of circuits or components of the mobile phone.

20. The mobile terminal according to claim 15, wherein:
the mobile terminal is a mobile phone,
the mobile phone comprises a radio frequency circuit, an audio circuit and a power circuit,
the radio frequency circuit is configured to establish communication between the mobile phone and a wireless network, to implement data receiving and transmission between the mobile phone and the wireless network,
the audio circuit is configured to: collect sounds and convert the collected sounds into audio data, such that the mobile phone transmits the audio data to the wireless network via the radio frequency circuit; and/or convert the audio data received by the mobile phone from the wireless network via the radio frequency circuit into the sounds and play the same for a user; and
the power circuit is configured to supply power for each of circuits or components of the mobile phone.

* * * * *